United States Patent
Oba et al.

(10) Patent No.: US 10,416,934 B2
(45) Date of Patent: Sep. 17, 2019

(54) CONTROL DEVICE FOR CONTROLLING AN IMAGE FORMING SYSTEM, IMAGE FORMING SYSTEM AND STORAGE MEDIUM

(71) Applicant: CANON KABUSHIKI KAISHA, Tokyo (JP)

(72) Inventors: Yoshitaka Oba, Matsudo (JP); Nobuaki Miyahara, Moriya (JP); Ryo Fujita, Tokyo (JP); Toru Shinnae, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/982,816

(22) Filed: May 17, 2018

(65) Prior Publication Data
US 2018/0335983 A1    Nov. 22, 2018

(30) Foreign Application Priority Data
May 22, 2017    (JP) ................. 2017-101135

(51) Int. Cl.
*G06F 3/12*    (2006.01)
*H04N 1/00*    (2006.01)

(52) U.S. Cl.
CPC .......... *G06F 3/1207* (2013.01); *G06F 3/1204* (2013.01); *G06F 3/1259* (2013.01); *G06F 3/1285* (2013.01); *H04N 1/00477* (2013.01); *G06F 3/1264* (2013.01)

(58) Field of Classification Search
None
See application file for complete search history.

(56) References Cited

U.S. PATENT DOCUMENTS

| | | | |
|---|---|---|---|
| 8,055,183 B2 | 11/2011 | Inenaga | |
| 8,177,222 B2* | 5/2012 | Yaginuma | B65H 1/14 271/152 |
| 9,242,829 B2* | 1/2016 | Miyajima | B65H 43/06 |
| 2001/0054793 A1* | 12/2001 | Nakahira | B65H 39/11 271/298 |

(Continued)

FOREIGN PATENT DOCUMENTS

| | | |
|---|---|---|
| JP | 2002362821 A | 12/2002 |
| JP | 2013146898 A | 8/2013 |

*Primary Examiner* — Thomas D Lee
(74) *Attorney, Agent, or Firm* — Canon U.S.A., Inc. IP Division

(57) ABSTRACT

A control device to control an image forming system having an image forming apparatus and a sheet discharge apparatus and includes a storage, a generator, and a controller. The storage stores sheet stacking information and taking out completion information. The generator generates a sheet bundle image representing a sheet bundle stacked on each of plural stacking trays based on the stored sheet stacking information. The controller combines the sheet bundle image with a system configuration image to display a combination on a display. The controller filters, from a list of processed image forming jobs, an image forming job for which sheets are not taken out to display the filtered image forming job on the display, and updates the sheet stacking information and the taking out completion information where the controller controls to determine that the sheet bundle stacked on any one of the plural stacking trays is taken out.

18 Claims, 15 Drawing Sheets

(56) References Cited

U.S. PATENT DOCUMENTS

| | | |
|---|---|---|
| 2005/0017426 A1 | 1/2005 | Hirata |
| 2006/0082818 A1* | 4/2006 | Kasamatsu ........ H04N 1/00342 |
| | | 358/1.15 |
| 2006/0261543 A1* | 11/2006 | Miyake .................. B65H 31/24 |
| | | 271/292 |
| 2006/0285869 A1 | 12/2006 | Kushida |
| 2008/0055637 A1 | 3/2008 | Hatakeyama |
| 2008/0178120 A1 | 7/2008 | Yamamoto |
| 2009/0041482 A1 | 2/2009 | Inenaga |
| 2010/0251170 A1 | 9/2010 | Louch |
| 2011/0075195 A1 | 3/2011 | Cain |
| 2011/0157642 A1 | 6/2011 | Nemoto |
| 2011/0211888 A1 | 9/2011 | Fujinaga |
| 2013/0334771 A1 | 12/2013 | Igarashi |
| 2015/0098101 A1 | 4/2015 | Asakawa |
| 2016/0031669 A1* | 2/2016 | Mori ...................... B65H 31/22 |
| | | 270/1.01 |
| 2016/0052320 A1 | 2/2016 | Mutsuno |
| 2016/0162222 A1 | 6/2016 | De Boer |

\* cited by examiner

CONTROL DEVICE FOR CONTROLLING AN IMAGE FORMING SYSTEM, IMAGE FORMING SYSTEM AND STORAGE MEDIUM

BACKGROUND OF THE INVENTION

Field of the Invention

The present disclosure relates to a control device configured to display a sheet discharge state of an image forming system including an image forming apparatus configured to form an image onto a sheet and a sheet discharge apparatus configured to discharge the sheet having the image formed thereon. Further, the present disclosure also relates to an image forming system and storage medium thereof.

Description of the Related Art

There are known service forms for image formation called print on demand (POD) and production printing. In such service forms, for example, small-lot and high-variety printing orders are received from customers. Then, images are quickly formed using an image forming apparatus operating at high speed to deliver the orders. At this time, images are rapidly formed onto a large amount of sheets (sheet-like media, the same holds true in the following), and the sheets are discharged. A large-capacity stacker is prepared at a discharge destination. The large-capacity stacker of this type stacks several thousands of sheets at one time. A plurality of large-capacity stackers may be connected so that, even when one large-capacity stacker is full, image formation can be continued by automatically switching a discharge destination to another large-capacity stacker. In this case, sheets having images formed thereon and corresponding to one image forming job are discharged to a plurality of discharge destinations in a divided manner. In the following description, the "sheet having the image formed thereon" is referred to as "sheet" in some cases.

Meanwhile, an operator performs work of taking out the discharged sheets having images formed thereon to proceed to the next step. However, it is not easy to identify a position of a sheet corresponding to an image forming job from a large amount of sheets discharged to a plurality of portions.

To address the above-mentioned issue, in the technology described in Japanese Patent Application Laid-open No. 2013-146898, a request for allowing the operator to check the sheet discharge destination is received for each image forming job. Then, an apparatus (sheet discharge apparatus, for example, large-capacity stacker) at the discharge destination is displayed on a predetermined display apparatus. In this manner, the operator can check the discharge destination of the sheet corresponding to each image forming job, and reliably take out the sheet corresponding a processed job.

In the technology disclosed in Japanese Patent Application Laid-open No. 2013-146898, information on the sheet discharge apparatus to which no sheets are discharged is not displayed. Therefore, in a configuration in which a plurality of sheet discharge apparatus are connected, it is difficult to recognize which stacking portion of which sheet discharge apparatus the discharge destination corresponds to. In the technology disclosed in Japanese Patent Application Laid-open No. 2013-146898, further, when there are a plurality of image forming jobs, only a discharge destination of the sheet corresponding to selected one of the image forming jobs is displayed. Therefore, the current sheet stacking state at the discharge destination cannot be correctly recognized. Further, also when the sheets are taken out, both of sheets corresponding to the image forming job, which have been taken out, and sheets corresponding to the image forming job, which have not been taken out, are displayed. Therefore, it takes time to identify the stacking state of a sheet bundle corresponding to the image forming job, which has not been taken out but is to be actually taken out.

SUMMARY OF THE INVENTION

The present disclosure provides an image forming apparatus that allows correct recognition of a stacking portion for removable sheets corresponding to an image forming job.

According to an aspect of the present invention, a control device to control an image forming system having an image forming apparatus to form an image onto a sheet based on an image forming job, and a sheet discharge apparatus having a plurality of stacking trays onto which the sheet having the image formed thereon is to be stacked, includes a storage configured to store sheet stacking information representing a stacking amount of sheets stacked on each of the plurality of stacking trays, and taking out completion information representing whether taking out of the sheets having the images formed thereon based on the image forming job is completed, a generator configured to generate a sheet bundle image representing a sheet bundle stacked on each of the plurality of stacking trays based on the sheet stacking information stored in the storage, and a controller configured to control to combine the sheet bundle image generated by the generator with a system configuration image representing a system configuration of the image forming system to display a result of combination on a display, wherein the controller is configured to control to: filter, from a list of a plurality of processed image forming jobs, an image forming job for which sheets are not taken out based on the taking out completion information stored in the storage, to thereby display the filtered image forming job on the display, and update the sheet stacking information and the taking out completion information in a case where the controller controls to determine that the sheet bundle stacked on any one of the plurality of stacking trays is taken out.

Further features of the present disclosure will become apparent from the following description of embodiments (with reference to the attached drawings).

DESCRIPTION OF THE EMBODIMENTS

First Embodiment

Figure 1:
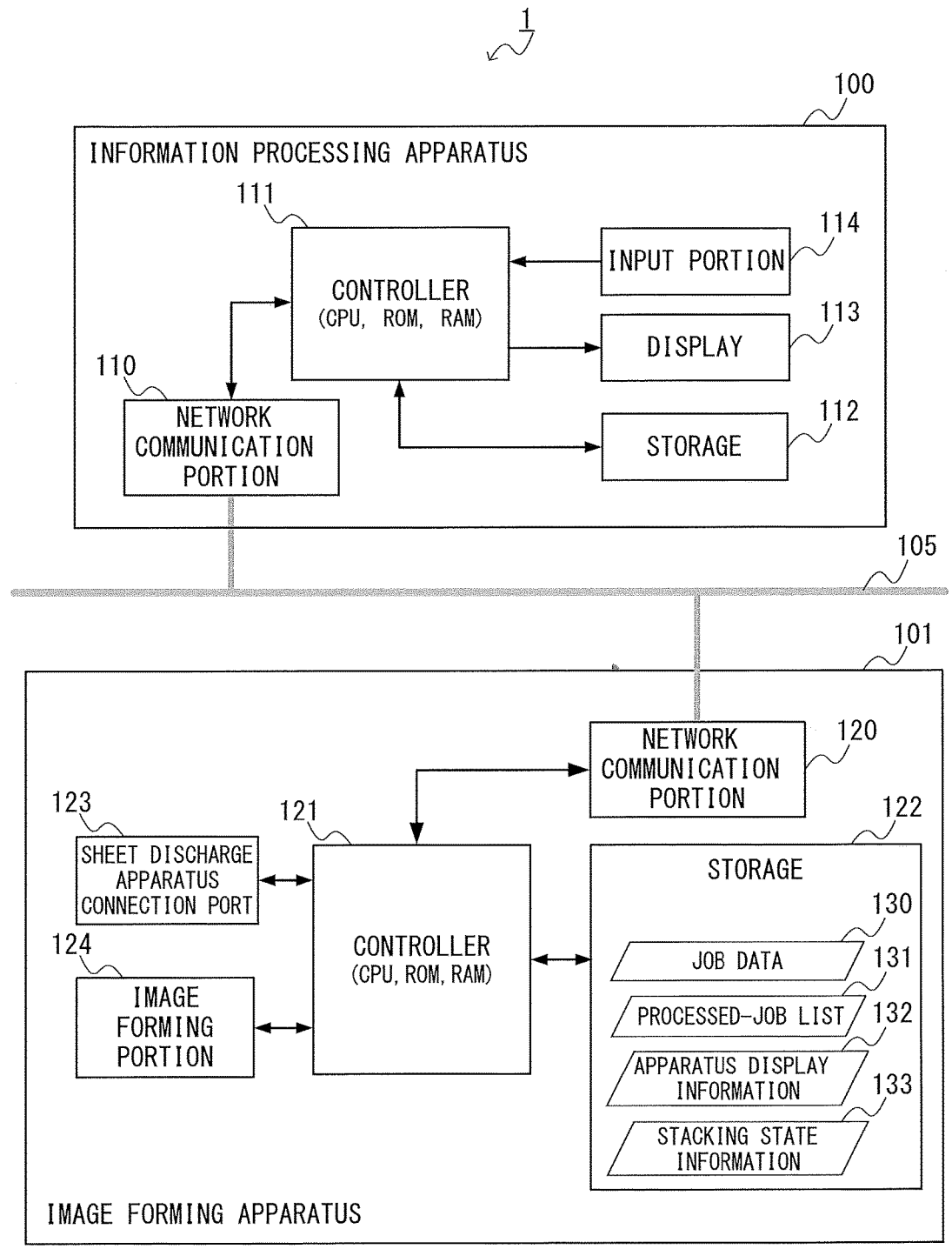
FIG. 1 is a configuration diagram of an image forming system.

FIG. 1 is a diagram for illustrating a schematic configuration example of an image forming system to which the present disclosure is applied. An image forming system 1 includes an information processing apparatus 100 and an image forming apparatus 101, which are connected to a communication network 105. The first embodiment represents an example in which one information processing apparatus 100 and one image forming apparatus 101 are provided, but a plurality of information processing apparatus 100 and a plurality of image forming apparatus 101 may be provided. The communication network 105 is a local area network (LAN). As the communication network 105, a wide area network (WAN), a combination of the LAN and the WAN, or a wired network may be employed instead.

The information processing apparatus 100 includes a network communication portion 110, a controller 111, a storage 112, a display 113, and an input portion 114. The network communication portion 110 is a communication device for controlling the communication performed with the communication network 105. The storage 112 is storage for storing large-capacity data in a short or long term. The display 113 is a display device for performing various types of display for an operator. In the first embodiment, the display 113 displays, for example, a system configuration image and a sheet bundle image to be described later. The input portion 114 receives various instructions from the operator, a range designation, input data, and designation of a processed job. The processed job refers to an image forming job for which image formation to the sheet has been finished as described later. When the display 113 is constructed of a touch panel, various instructions from the operator can also be input from the display 113.

The controller 111 is one type of computer including a central processing unit (CPU), a read only memory (ROM), and a random access memory (RAM). The CPU executes a computer program for terminal control to form various functions for the information processing apparatus 100. This operation is described later. The ROM stores the above-mentioned computer program and the like. The RAM is a work memory for the CPU.

The image forming apparatus 101 includes a network communication portion 120, a controller 121, a storage 122, a sheet discharge apparatus connection port 123, and an image forming portion 124. The network communication portion 120 is a communication device for controlling the communication performed with the communication network 105. The storage 122 is a storage for storing large-capacity data in a short or long term. The sheet discharge apparatus connection port 123 is a connection device for connecting the sheet discharge apparatus. The image forming portion 124 is an image forming device for forming an image onto a sheet for each input image forming job. The controller 121 is a computer including a CPU, a ROM, and a RAM, or may be an embedded computer. The CPU executes a computer program for image formation control to form various functions for the image forming apparatus 101 and operate as a control device for controlling an operation of each of the functions. This operation is described later. The ROM stores the above-mentioned computer program for image formation control. The RAM is a work memory for the CPU.

The storage 122 of the image forming apparatus 101 stores job data 130, a processed-job list 131, apparatus display information 132, and stacking state information (sheet stacking information) 133. Examples of the job data 130 include image data and instruction data representing the details of the input image forming job, data obtained after execution of the image forming job, and data obtained during the process of execution of the image forming job. The processed-job list 131 is a list storing the image forming jobs executed by the image forming apparatus 101 as the processed jobs. The processed-job list 131 stores, for example, job attributes such as a job ID, a job name, the number of pages, the number of bundles, and a sheet in association with one another.

The apparatus display information 132 is one type of first information representing the entire arrangement mode of an image forming device and a plurality of sheet stacking devices, and is referred to when a system configuration image to be described later is generated. In this example, the image forming device corresponds to the image forming apparatus 101, and the sheet stacking device corresponds to a sheet discharge apparatus to be described later. Therefore, information representing the outer appearance, structure, and size of each of the image forming apparatus 101 and the sheet discharge apparatus, and the outer appearance, structure, and size as a whole during connection is referred to as the apparatus display information 132. For example, it is assumed that three sheet discharge apparatus are connected to the image forming apparatus 101 in a daisy-chain configuration. In this case, the apparatus display information 132 represents a mode in which the sheet discharge apparatus adjacent to the image forming apparatus 101 is arranged as the first sheet discharge apparatus, and then the second sheet discharge apparatus and the third sheet discharge apparatus are sequentially arranged. The apparatus display information 132 is determined based on the combination of the connected sheet discharge apparatus. The sheet discharge apparatus is arranged to be replaceable with other sheet discharge apparatus. Therefore, the apparatus display information 132 is updated to new information as appropriate.

The stacking state information 133 is one type of second information representing a sheet stacking state of sheets having images formed thereon in each sheet stacking device, and is referred to when a sheet bundle image to be described later is generated. The sheet having an image formed thereon is hereinafter referred to as "sheet". Further, a group of two sheets or more is hereinafter referred to as "sheet bundle" in some cases. The stacking state information 133 includes information representing the shape and the size of the sheet or the sheet bundle, which is required for generating the sheet bundle image to be described later. This information is updated in real time every time detection information, that is, a detection result of a stacking state, detected by a detection device to be described later is acquired. The "stacking state" herein refers to presence or absence of a sheet at a sheet stacking portion (including the change in portion at which the sheets are stacked), and the transition of the outer shape and the size of the sheet and the sheet stacking height, that is, refers to all the changes in sheet state until the sheets are taken out by an ejecting operation to be described later.

Next, the sheet discharge apparatus to be connected to the sheet discharge apparatus connection port 123 of the image forming apparatus 101 are described. The sheet discharge apparatus refers to a large-capacity stacker and a finisher, and are apparatus capable of being freely combined or replaced afterwards. Those sheet discharge apparatus operate as a sheet stacking device capable of stacking and taking out the sheets for each image forming job. That is, each sheet discharge apparatus stacks sheets corresponding to a processed job onto the sheet stacking portion to achieve a sheet bundle of each image forming job.

Figure 2:
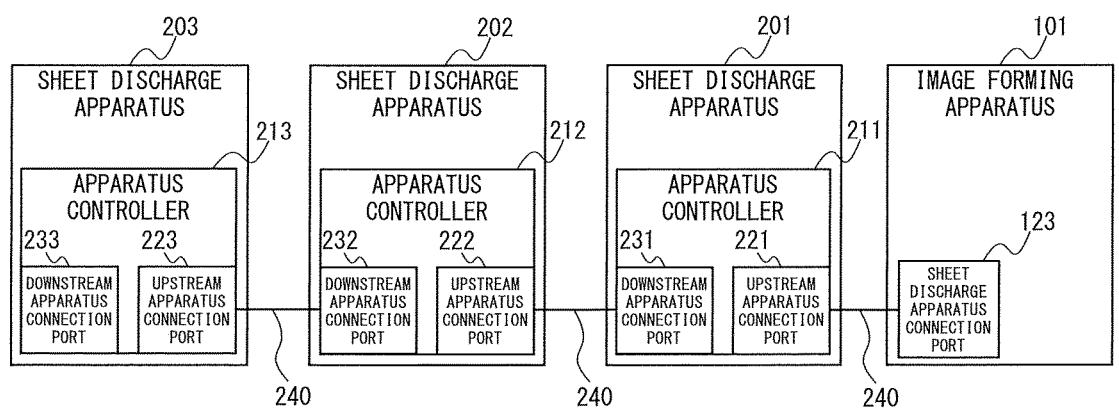
FIG. 2 is a schematic diagram for illustrating a state in which sheet discharge apparatus are connected to an image forming apparatus.

FIG. 2 is a schematic diagram for illustrating a connection example in a case in which three sheet discharge apparatus 201 to 203 are connected to the sheet discharge apparatus connection port 123 in a daisy-chain configuration. The sheet discharge apparatus 201 to 203 include apparatus controllers 211, 212, and 213, respectively, for controlling the operation of each own apparatus. The apparatus controllers 211, 212, and 213 include upstream apparatus connection ports 221, 222, and 223 and downstream apparatus connection ports 231, 232, and 233, respectively. Each of the upstream apparatus connection ports 221, 222, and 223 is a port for connecting to an apparatus on the upstream of the own apparatus via a communication cable 240. Each of the downstream apparatus connection ports 231, 232, and 233 is a port for connecting to an apparatus on the downstream of the own apparatus via the communication cable 240. In this manner, the image forming apparatus 101 and the three sheet discharge apparatus 201, 202, and 203 can communicate with each other. The third sheet discharge apparatus 203 may be omitted, or another apparatus that can communicate with the image forming apparatus 101 may be connected on the downstream of the third sheet discharge apparatus 203.

Figure 3:
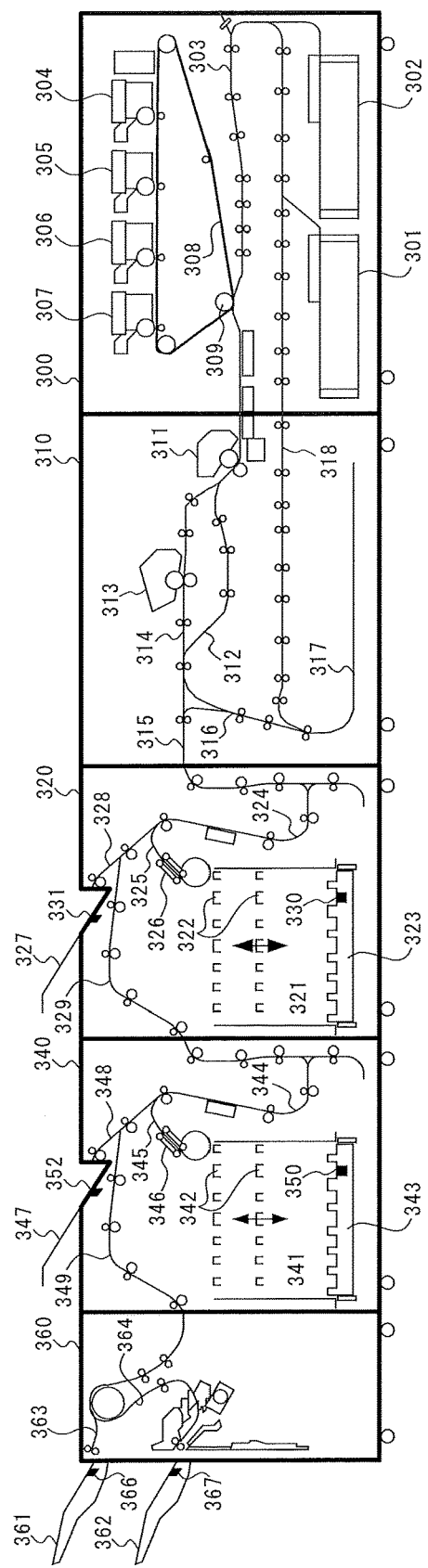
FIG. 3 is a sectional view for illustrating conveyance mechanisms of the image forming system.

Each of the image forming apparatus 101 and the sheet discharge apparatus 201, 202, and 203 includes a sheet conveyance mechanism as a mechanical element. FIG. 3 is an explanatory view for illustrating those conveyance mechanisms. In FIG. 3, an image forming unit 300 is a unit configured to form an image to be transferred onto a sheet, and corresponds to the image forming portion 124 in FIG. 1. An image fixing unit 310 is a unit configured to fix the transferred image. Two large-capacity stackers 320 and 340 and one finisher 360 are connected to the image fixing unit 310 in a daisy-chain configuration.

In the image forming unit 300, each of sheet feeding decks 301 and 302 separates one uppermost sheet among the received sheets to convey the sheet to a sheet conveyance path 303. Development stations 304 to 307 use toner having colors of yellow (Y), magenta (M), cyan (C), and black (K) to cause adhesion of toner images. The adhering toner images are primarily transferred onto an intermediate transfer belt 308. The intermediate transfer belt 308 rotates, for example, clockwise to convey the sheet to a secondary transfer position 309. At this time, the toner images are transferred onto the sheet conveyed through the sheet conveyance path 303. The sheet having the toner images transferred thereon is conveyed to the image fixing unit 310.

In the image fixing unit 310, a fixing unit 311 melts and pressurizes the toner images to fix the toner images onto the sheet. The sheet that has passed through the fixing unit 311 is conveyed from a sheet conveyance path 312 to a sheet conveyance path 315. Additional heating and pressurization may be required depending on the sheet type. In this case, after the sheet passes through the fixing unit 311, the sheet is conveyed to a second fixing unit 313 using a sheet conveyance path in the stage subsequent to the fixing unit 311. The sheet subjected to additional heating and pressurization is conveyed to a sheet conveyance path 314. A reversing portion 316 reverses the conveyed sheet by a switch-back method. When an image is formed on one side of the sheet, the reversed sheet, that is, the sheet having an image formed thereon, is conveyed to the sheet conveyance path 315. When images are formed on both sides of the sheet, the sheet is conveyed to a duplex reverse path 317, and is reversed to be conveyed to a duplex conveyance path 318. In this manner, an image is formed on the second side at the secondary transfer position 309, and the sheet is conveyed to the sheet conveyance path 315. The sheet that has passed through the sheet conveyance path 315 passes through a sheet conveyance path 324 to be input to the large-capacity stacker 320.

The large-capacity stacker 320 includes a stacking portion 321 including a lift tray 322 and an ejection tray 323, which are each configured to stack sheets. Those trays are controlled by the apparatus controller 211 illustrated in FIG. 2. The lift tray 322 is positioned at a sheet stacking portion having a predetermined height under a state in which no sheets are stacked, and is lowered when the stacking proceeds. The ejection tray 323 is a tray for re-stacking the sheets at a time point at which the lift tray 322 is lowered to a re-stacking position, to thereby eject the sheets to the outside of the apparatus. The lift tray 322 and the ejection tray 323 are formed so that their bars for supporting the sheets are present at alternate positions. Therefore, the sheets on the lift tray 322 can be re-stacked onto the ejection tray 323 without any issue. The sheet passes through the sheet conveyance path 324 and a sheet conveyance path 325 to be conveyed to a sheet discharge unit 326. The sheet discharge unit 326 includes a lower rotary member and an upper rotary member that are configured to nip the sheet, and to discharge the sheet in a flipped manner to the lift tray 322. The action of "discharging the sheet in a flipped manner" refers to an action of discharging the sheet with the front and back sides being reversed so that one of both surfaces of the sheet on a side in contact with the lower rotary member of the sheet discharge unit 326 is turned to become an upper surface on the lift tray 322.

The lift tray 322 is controlled to be lowered by an amount of a height of the stacked sheets as the stacking of the sheets proceeds so that an upper end of the stacked sheets is always at a predetermined height. When the lift tray 322 is in a fully-stacked state, the lift tray 322 is lowered to the position of the ejection tray 323. The "fully-stacked state" refers to a state in which the sheets reach a maximum stackable amount of the lift tray 322 and no more sheets can be stacked on the lift tray 322. Then, at a time point at which the lift tray 322 reaches the re-stacking position that is lower than the ejection tray 323, the sheets are re-stacked onto the ejection tray 323. After that, the ejection tray 323 is carried to the outside of the apparatus. In this manner, the sheets are removable. This operation is called "ejecting operation".

The large-capacity stacker 320 further includes a top tray 327. The top tray 327 is one sheet stacking portion mainly used for outputting a sample of the sheets to be stacked on the stacking portion 321. During discharge to the stacking portion 321, one sheet (or one bundle) is output to the top tray 327 as a sample. In this manner, the quality of the image formation can be checked without taking out the sheets stacked in the stacking portion 321. When a sheet is output to the top tray 327, the sheet passes through the sheet conveyance path 324 and a sheet conveyance path 328 to be conveyed to the top tray 327. When a sheet is conveyed to an apparatus on the downstream of the large-capacity stacker 320, the sheet is conveyed through a sheet conveyance path 329.

The ejection tray 323 and the top tray 327 include sheet presence/absence detection sensors 330 and 331, respectively. The sheet presence/absence detection sensors 330 and 331 operate as one type of a detection device for detecting the change in stacking state of the sheets on the tray at every predetermined timing. The controller 121 acquires the detection information detected by the sheet presence/absence detection sensors 330 and 331 in time series, and updates the stacking state information 133 in the storage 122 based on the acquired detection information. The large-capacity stacker 340 has the same configuration as that of the large-capacity stacker 320. That is, the stacking portion 321 (lift tray 322 and ejection tray 323) of the large-capacity stacker 320 corresponds to a stacking portion 341 (lift tray 342 and ejection tray 343) of the large-capacity stacker 340. Similarly, the sheet conveyance paths 324, 325, 328, and 329 and the sheet discharge unit 326 of the large-capacity stacker 320 correspond to sheet conveyance paths 344, 345, 348, and 349 and a sheet discharge unit 346 of the large-capacity stacker 340, respectively. Further, the top tray 327 and the sheet presence/absence detection sensors 330 and 331 of the large-capacity stacker 320 correspond to a top tray 347 and sheet presence/absence detection sensors 350 and 352 of the large-capacity stacker 340, respectively. Those components are controlled by the apparatus controller 212.

The finisher 360 subjects the conveyed sheet to predetermined post-processing under the control of the apparatus controller 213 illustrated in FIG. 2 based on the function designated by the operator. As an example of the post-processing, in this example, the sheet is subjected to stapling (one-portion or two-portion binding) and punching (two or three holes). The finisher 360 includes two sheet discharge trays 361 and 362 each serving as a sheet stacking portion. To the sheet discharge tray 361, a sheet not to be subjected to post-processing, for example, stapling, is discharged through a sheet conveyance path 363. To the sheet discharge tray 362, a sheet subjected to a finishing function designated by the operator is discharged through a sheet conveyance path 364.

Each of the sheet discharge trays 361 and 362 is configured to be freely raised or lowered. It is also possible to perform such an operation that the sheet discharge tray 361 is lowered so that a plurality of sheets subjected to post-processing are stacked onto the sheet discharge tray 361. The sheet discharge trays 361 and 362 include sheet presence/absence detection sensors 366 and 367, respectively, which are each configured to detect the stacking state of the sheets on the tray. The sheet presence/absence detection sensors 366 and 367 also operate as one type of a detection device for detecting the change in stacking state of sheets on the tray at every predetermined timing. The detection results are transmitted to the image forming apparatus 101 in time series by the apparatus controllers included in the large-capacity stackers 320 and 340.

Next, description is given of the sheet stacking state in the large-capacity stacker 320 with reference to FIG. 4A to FIG. 4G. In each drawing, a right side as viewed from an observer corresponds to a sectional view in which the mechanical elements of the large-capacity stacker 320 are viewed from the front side, and a left side as viewed from the observer corresponds to a sectional view in which the mechanical elements of the large-capacity stacker 320 are viewed from the left lateral side. The large-capacity stacker 340 has a similar configuration, and hence the large-capacity stacker 320 is described as a representative stacker.

Figure 4A:
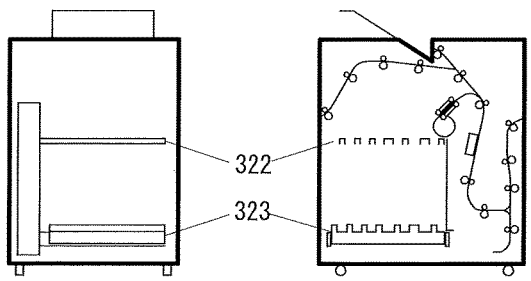
FIG. 4A, FIG. 4B, FIG. 4C, FIG. 4D, FIG. 4E, FIG. 4F, and FIG. 4G are schematic views for illustrating a process of an ejecting operation.

FIG. 4A is an illustration of a state in which no sheets are stacked on the large-capacity stacker 320. The lift tray 322 is raised and stopped at a predetermined height, that is, at a position of a sheet discharge port for discharging the sheets to the stacking portion 321. The ejection tray 323 is accommodated in the apparatus. FIG. 4B is an illustration of a state during an image forming operation. As the stacking of the sheet proceeds, the apparatus controller gradually lowers the lift tray 322 so that the height of the uppermost surface of the stacked sheets matches the position of the sheet discharge port of the stacking portion 321. FIG. 4C is an illustration of a state in which it is determined that a fully-stacked state of the lift tray 322 is detected. When the lift tray 322 is in the fully-stacked state, stacking onto the lift tray 322 cannot be continued any more. Therefore, the apparatus controller starts control of re-stacking the stacked sheets onto the ejection tray 323. FIG. 4D is an illustration of a state in which the lift tray 322 is lowered to the re-stacking position of the ejection tray 323 and the sheets are re-stacked onto the ejection tray 323. Even when the lift tray 322 is lowered to the same height as that of the ejection tray 323, the bars for supporting the sheets are located at alternate positions, and hence the bars do not interfere with each other. At a time point at which the lift tray 322 reaches the re-stacking position that is lower than the ejection tray 323, there is obtained a state in which the sheets stacked on the lift tray 322 are re-stacked onto the ejection tray 323.

Figure 4E:
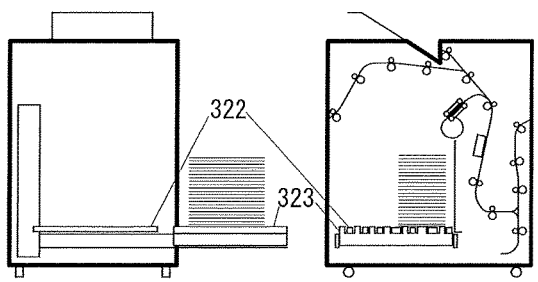
Figure 4B:
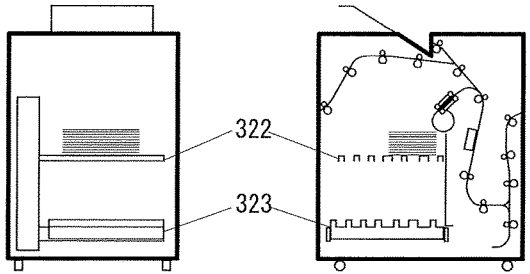
Figure 4F:
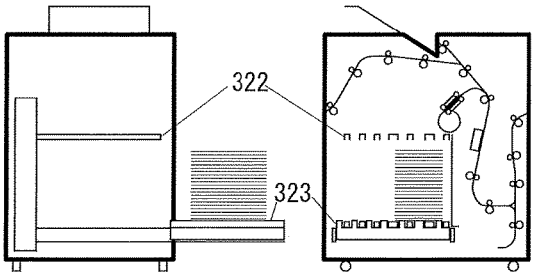
Figure 4C:
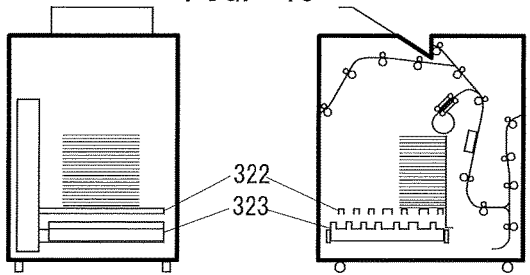
Figure 4G:
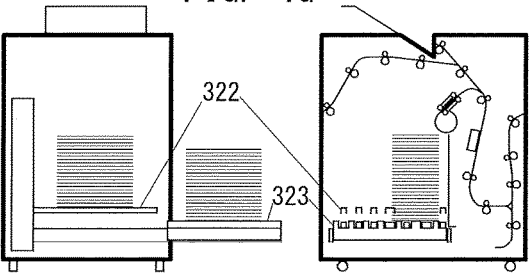
Figure 4D:
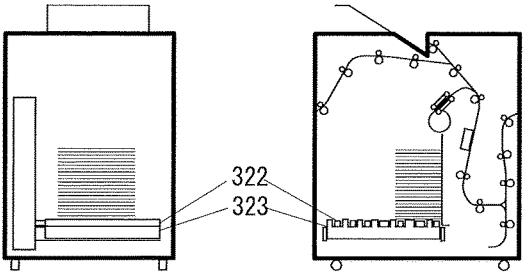

FIG. 4E is an illustration of a state in which the ejection tray 323 having the sheets stacked thereon is ejected to the outside of the apparatus. When the ejection tray 323 is ejected as described above, the stacked sheets can be taken out. FIG. 4F is an illustration of a state in which, under a state in which the ejection tray 323 is ejected, the lift tray 322 is raised again to the position at which the subsequent sheets are stacked thereonto. In this manner, sheets can be stacked on the lift tray 322. FIG. 4G is an illustration of a state in which, after the image formation is continued under a state in which the ejection tray 323 is ejected, the stacking state of the lift tray 322 is determined as being in the fully-stacked state. In this state, the ejection tray 323 is ejected, and hence the sheets stacked on the lift tray 322 cannot be re-stacked onto the ejection tray 323. The sheets stacked on the ejection tray 323 are required to be taken out to continue the stacking in the large-capacity stacker 320.

Figure 5:
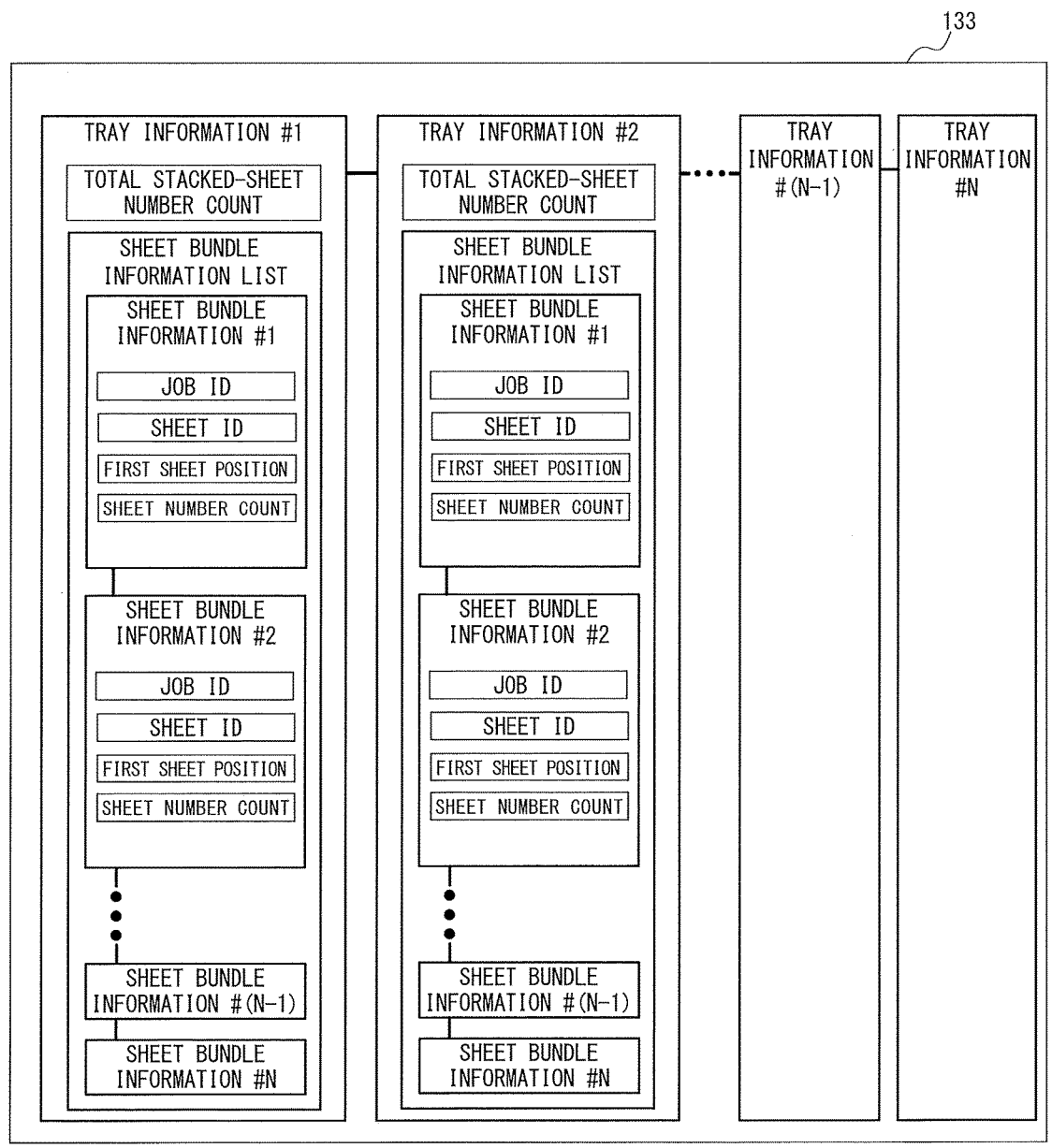
FIG. 5 is a diagram of stacking state information.

FIG. 5 is a diagram of the stacking state information 133. The stacking state information 133 is stored in the storage 122. The stacking state information 133 is updated, for example, at a timing at which the detection result of the stacking state in each sheet discharge tray is acquired, and can be referred to as appropriate. The stacking state information 133 has a list-type data structure. That is, tray information representing the stacking state of the usable sheet discharge tray for each tray is represented as tray information #1 to tray information #N. N is a natural number.

In FIG. 5, the tray information #1 to the tray information #N are in a data format having a total stacked-sheet number count and a sheet bundle information list as member variables. The total stacked-sheet number count is a variable for counting a total number of sheets stacked on the sheet discharge tray. In the sheet bundle information list, pieces of sheet bundle information for managing the information on each sheet bundle are arranged in a list in the stacking order of the sheets. When no sheets are stacked on any sheet discharge tray, the sheet bundle information list is an empty list. Each piece of sheet bundle information has, as member variables, a job ID, a sheet ID, a first sheet position, and a sheet number count. The job ID is a variable representing an ID of an image forming job corresponding to the sheet bundle. Each image forming job is allocated with a unique ID by the image forming apparatus 101, and the ID is stored in the member variable. The sheet ID is a variable representing an ID of the sheet corresponding to the sheet bundle. The sheet is defined based on characteristics such as a size, a basis weight, and states of the front and back surfaces, and a sheet ID allocated for identifying the sheet is recorded in the member variable. The first sheet position is a variable representing what number the first sheet of the sheet bundle corresponds to when counted from the first sheet stacked on the sheet discharge tray. The sheet number count is a variable for counting the total number of sheets of the sheet bundle.

Figure 6:
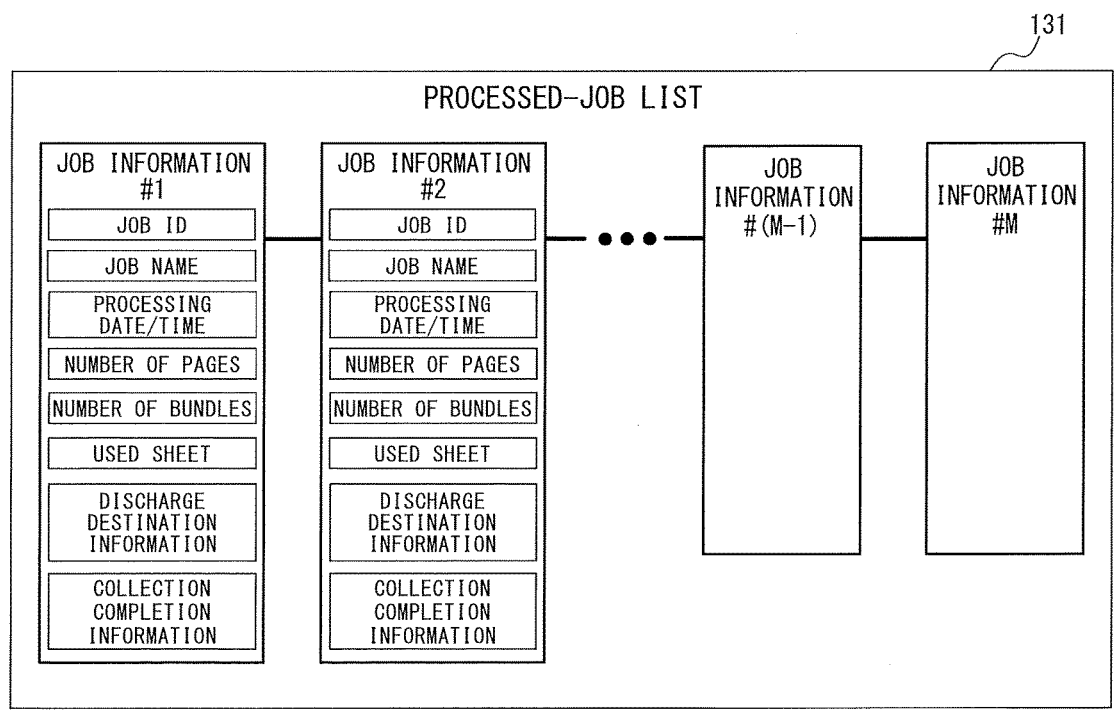
FIG. 6 is a diagram of a processed-job list.

FIG. 6 is a schematic diagram for illustrating the processed-job list 131. The processed-job list 131 is stored in the storage 122, and is referred to and updated as appropriate. The processed-job list 131 has a list-type data structure, and pieces of job information each representing configuration information on each image forming job are arranged in a form of a list (job information 1 to job information M in FIG. 6: M is a natural number). There are generated as many pieces of job information as the number (M) of jobs for which images are formed. Each piece of job information is formed of a structure data type, and has, as member variables, a job ID, a job name, a processing date/time, the number of pages, the number of bundles, a used sheet, discharge destination information, and taking out completion information. The job ID is a variable for representing a unique ID allocated by the image forming apparatus 101. The job name is a character string for representing the job name included in the job. The processing date/time is a variable for representing the date and time at which the image is formed for the job by the image forming apparatus 101 and the sheet is discharged. The number of pages is a variable for representing the number of image forming surfaces included in the job. The number of bundles is a variable for representing the number of bundles of sheets of each job. The used sheet is a variable for representing information on a sheet to be used when a job is output. The discharge destination information is a variable for representing an output destination of a sheet at the time when a job is executed by the image forming apparatus 101 to output the sheet. The taking out completion information is a variable for representing information on an output destination of a sheet at the time when a job is executed and the output medium is taken out from the output destination to which the sheet is output.

Figure 7:
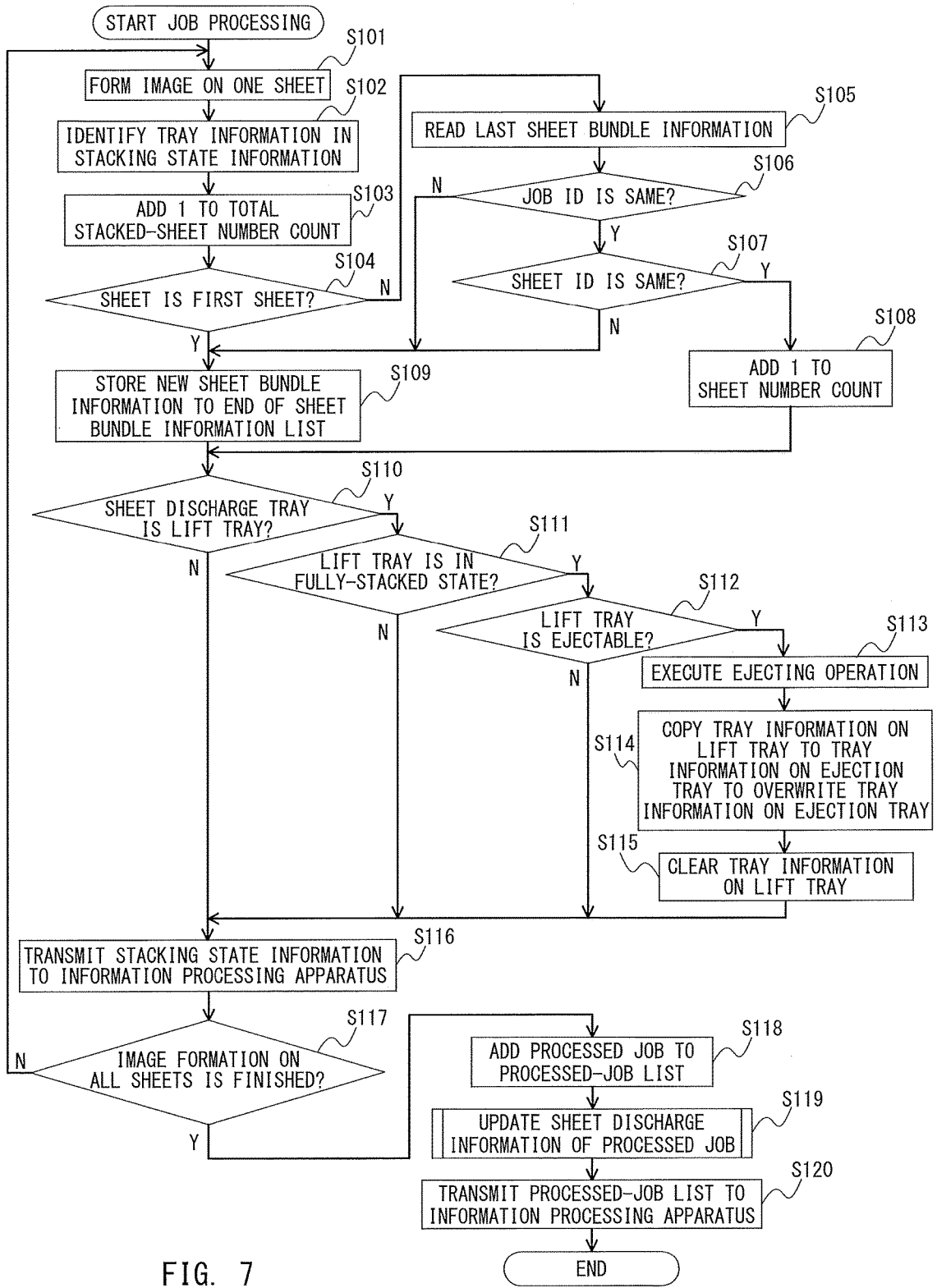
FIG. 7 is a control flow for illustrating an operation procedure at the time when the image forming apparatus is activated.

Next, with reference to FIG. 7, description is given of an operation example at the time when the image forming job is executed in the image forming apparatus 101. It is assumed that the image forming job is received from, for example, the information processing apparatus 100. The image forming job includes designation of tray information on the sheet stacking portion, that is, the sheet discharge apparatus. In the following description, for the sake of convenience, it is assumed that the tray information on the large-capacity stacker 320 is designated. FIG. 7 is a control flow of the image forming apparatus 101 at this time. This control flow is executed by the controller 121 integrally controlling the respective portions of the apparatus.

In the image forming apparatus 101, image formation of one sheet is performed in the order of pages in accordance with the image forming job. After the image formation, the conveyance of the sheet toward the large-capacity stacker 320 designated by the image forming job is started (Step S101). At this time, the controller 121 identifies the tray information on the designated large-capacity stacker 320 (Step S102). The tray information can be identified by referring to the apparatus display information 132 determined based on the apparatus configuration of the sheet discharge apparatus.

The controller 121 adds 1 to the total stacked-sheet number count of the identified tray information (Step S103). The controller 121 further determines whether or not the discharged sheet is the first sheet in the sheet discharge tray based on the value of the total stacked-sheet number count (Step S104). When the sheet is not the first sheet (Step S104: N), the controller 121 refers to the tray information to read last sheet bundle information in the sheet bundle information list (Step S105). Then, the controller 121 determines whether or not the job ID of the job for which the image formation is performed (being processed) is the same as the job ID in the sheet bundle information read in Step S105 (Step S106). When the job ID is the same (Step S106: Y), the controller 121 determines whether or not the sheet ID of the sheet subjected to image formation in Step S101 is the same as the sheet ID in the sheet bundle information read in Step S105 (Step S107). When the sheet ID is the same (Step S107: Y), the controller 121 adds 1 to the sheet number count of the last sheet bundle information in the tray information (Step S108), and the processing proceeds to Step S110.

When the sheet is the first sheet in Step S104 (Step S104: Y), when the job ID differs in Step S106 (Step S106: N), and when the sheet ID differs in Step S107 (Step S107: N), the controller 121 executes the processing of Step S109. That is, new sheet bundle information is generated at the end of the sheet bundle information list in the tray information. The member variables of the generated new sheet bundle information are as follows. First, the job ID is the job ID of the job for which the image formation is performed. The sheet ID is a sheet ID corresponding to the sheet subjected to image formation in Step S101. The total stacked-sheet number count is input as the first sheet position. Finally, the sheet number count is 1.

Next, the controller 121 determines whether or not the sheet discharge tray designated in Step S101 is the lift tray of the large-capacity stacker 320 (Step S110). When the sheet discharge tray is the lift tray (Step S110: Y), the controller 121 determines whether or not the lift tray is in the fully-stacked state after sheets are discharged in Step S101 (Step S111). When the lift tray is in the fully-stacked state (Step S111: Y), the controller 121 determines whether or not the lift tray in the fully-stacked state in Step S111 is ejectable (Step S112). Whether the lift tray is ejectable is determined based on whether or not the sheet bundles are stacked on the ejection tray of the same large-capacity stacker. When the sheet bundles are stacked on the ejection tray, that is, when the sheet presence/absence detection sensor 330 detects that the sheet bundles are stacked, the controller 121 determines that the lift tray is not ejectable. Otherwise, the controller 121 determines that the lift tray is ejectable. When the lift tray is ejectable (Step S112: Y), the controller 121 re-stacks the sheet bundles stacked on the lift tray detected to be in the fully-stacked state in Step S111 onto the ejection tray, and executes the ejecting operation (Step S113). After that, the controller 121 copies, in the stacking state information 133, the tray information on the lift tray for which the ejecting operation of the large-capacity stacker 320 is executed in Step S113, to the tray information on the same large-capacity stacker to overwrite the tray information on the same large-capacity stacker (Step S114). Further, the controller 121 clears, in the stacking state information 133, the tray information on the lift tray for which the ejecting operation is executed in Step S113 (Step S115). In this case, clearing the tray information refers to obtaining an empty sheet bundle information list by setting the total stacked-sheet number count in the tray information to 0.

When the sheet discharge tray is not the lift tray (Step S110: N), when the lift tray is not in the fully-stacked state (Step S111: N), and when the lift tray is not ejectable (Step S112: N), the controller 121 transmits the stacking state information 133 to the information processing apparatus 100 (Step S116). The same is applied after the tray information on the lift tray is cleared (Step S115). After that, the controller 121 determines whether or not the image formation of all of the sheets by the image forming job is finished (Step S117). When the image formation is not finished yet (Step S117: N), the processing returns to Step S101. When image formation of all of the sheets is finished (Step S117: Y), the controller 121 adds the processed job to the processed-job list 131 (Step S118). Further, the discharge destination information of the processed job is updated (Step S119). After that, the updated processed-job list 131 is transmitted to the information processing apparatus 100 (Step S120), and the series of processing is ended.

Figure 8:
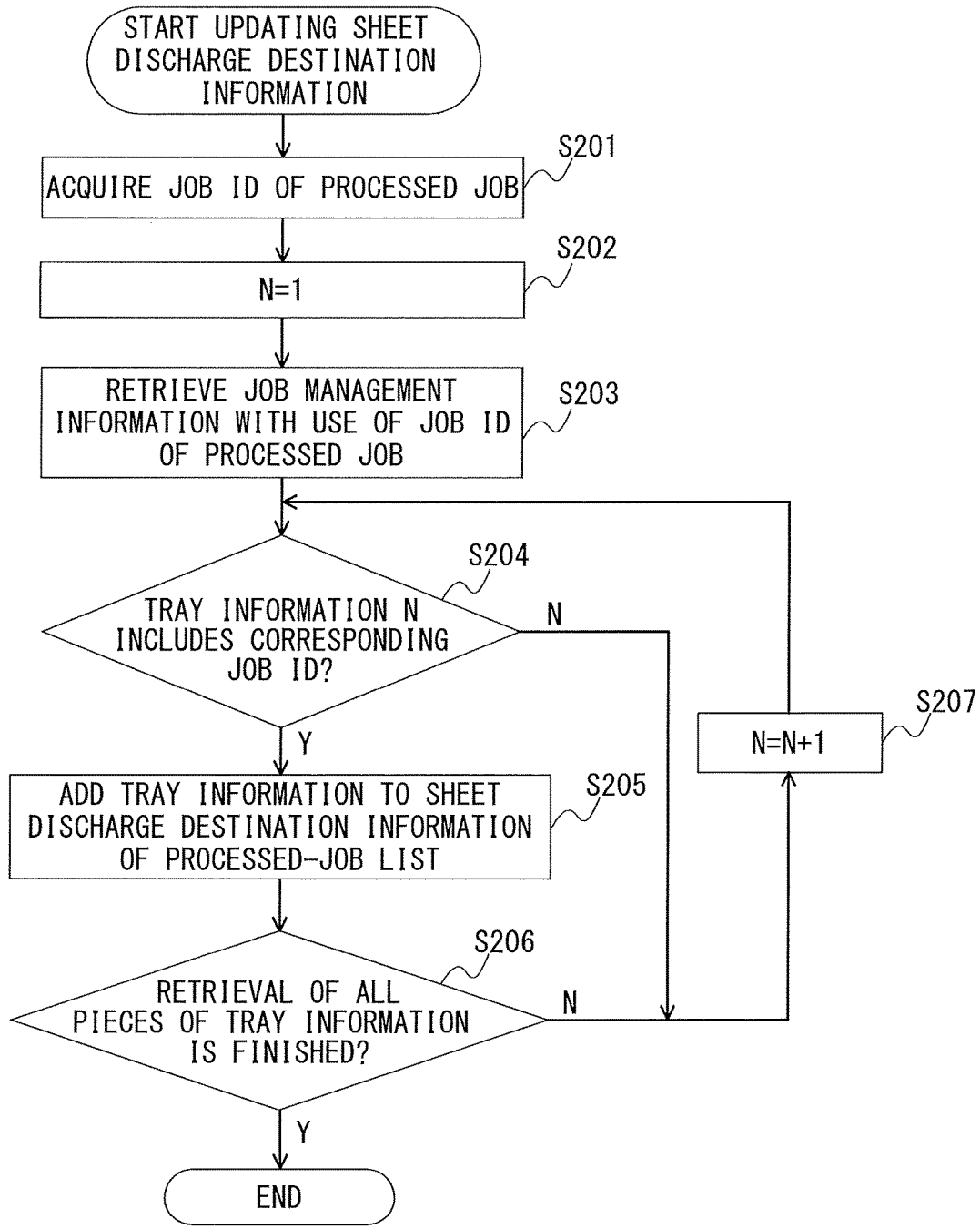
FIG. 8 is a control flow for illustrating a procedure of processing of updating discharge destination information.

FIG. 8 is a detailed flow of the processing (Step S119 of FIG. 7) of updating the discharge destination information. This detailed flow is executed by the controller 121. The controller 121 acquires the job ID of the processed job (Step S201), and substitutes 1 for a variable N representing the order of processed jobs (Step S202). The controller 121 uses the job ID of the processed job to retrieve the stacking state information 133 (Step S203), and determines whether or not the tray information N includes the corresponding job 1D (Step S204). When the same job ID is included (Step S204: Y), the controller 121 adds the tray information to the discharge destination information of the processed job having the corresponding job ID in the processed-job list 131 (Step S205). After the tray information is added or when the same job ID is not included in Step S204 (Step S204: N), the controller 121 determines whether or not retrieval is finished for all pieces of tray information of the stacking state information (Step S206). When retrieval of all pieces of tray information is finished (Step S206: Y), the series of processing is ended. When retrieval of all pieces of tray information is not finished (Step S206: N), the controller 121 adds 1 to the variable N (Step S207), and the processing returns to Step S204.

Figure 9:
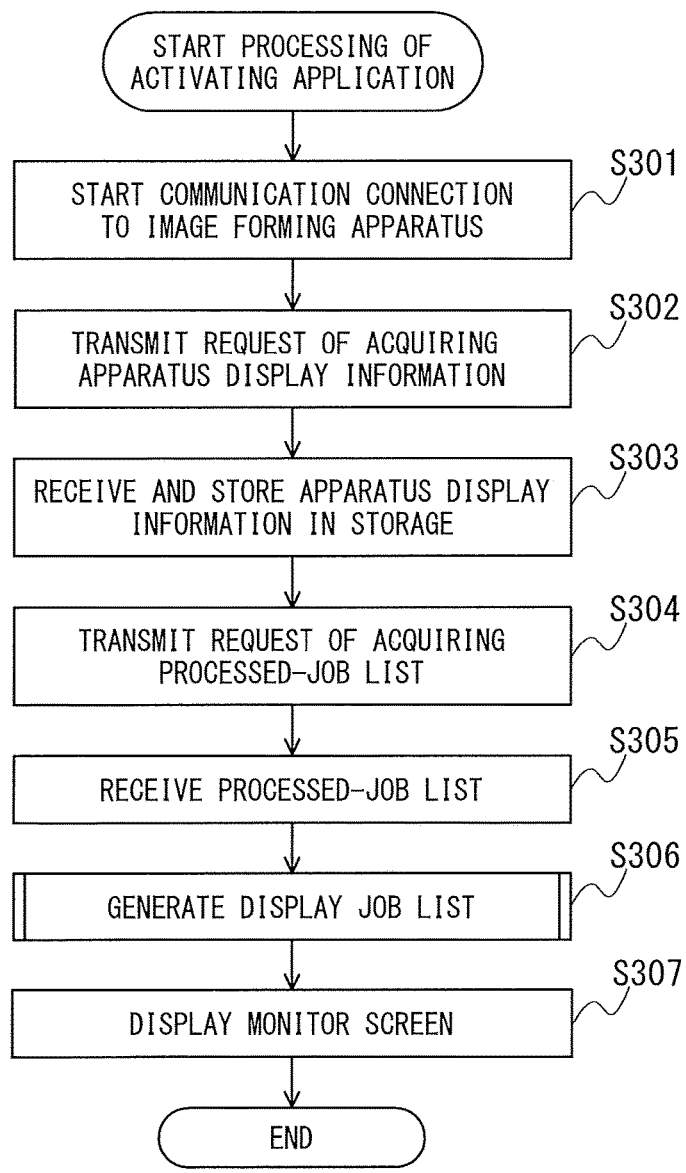
FIG. 9 is a control flow for illustrating an operation procedure of an information processing apparatus (at the time of activation).

The operator can recognize the stacking state of each sheet discharge apparatus connected to the image forming apparatus 101 as required by an application executed by the computer program for terminal control in the information processing apparatus 100. The operation of the information processing apparatus 100 at this time is described with reference to FIG. 9. FIG. 9 is a control flow at the time when the application is activated. This control flow is executed by the controller 111 integrally controlling the respective portions of the terminal.

When an application is activated in the information processing apparatus 100, the controller 111 starts communication connection to the image forming apparatus 101 (Step S301). The communication connection refers to continuous establishment of a communication path until the operator inputs a clear cancel instruction. When the communication path is established, a request for the apparatus display information 132 is transmitted to the image forming apparatus 101 (Step S302). When the image forming apparatus 101 receives this request, the image forming apparatus 101 transmits the apparatus display information 132 corresponding to the current apparatus configuration. When the apparatus display information 132 is updated while the communication connection is established, the image forming apparatus 101 transmits the updated apparatus display information 132 to the information processing apparatus 100 (Step S303). When the information processing apparatus 100 acquires the updated apparatus display information 132 from the image forming apparatus 101, the information processing apparatus 100 sequentially stores the apparatus display information 132 to the storage 112 (Step S303).

The controller 111 further transmits a request for the stacking state information and the processed-job list to the image forming apparatus 101 (Step S304). When the image forming apparatus 101 receives this request, the image forming apparatus 101 transmits the stacking state information 133 and the processed-job list 131 that are currently stored to the information processing apparatus 100. The controller 111 stores the stacking state information 133 and the processed-job list 131 acquired from the image forming apparatus 101 to the storage 112 (Step S305). Further, the controller 111 generates a display job list based on the stored apparatus display information 132, stacking state information 133, and processed-job list 131 (Step S306). How to generate the display job list is described later. Then, the controller 111 refers to the display job list to generate the monitor screen, and displays the monitor screen on the display 113 (Step S307).

Figure 10:
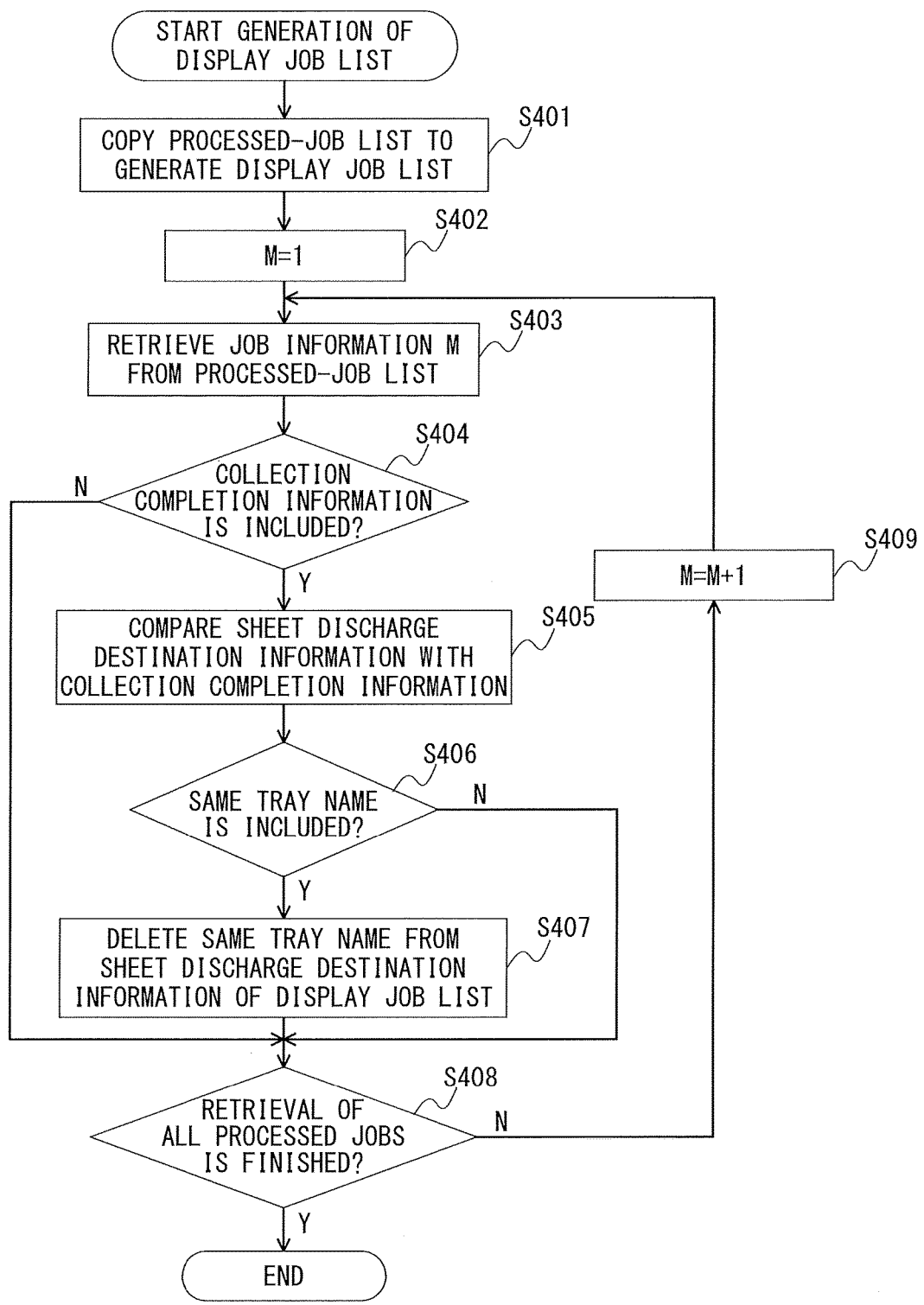
FIG. 10 is a control flow for illustrating a procedure of processing of generating a display job list.

FIG. 10 is a detailed flow of the processing of generating the display job list, and is executed by the controller 111. The controller 111 copies the received processed-job list 131 to generate the display job list (Step S401). The controller 11*l* substitutes 1 for a variable M representing the order of jobs (Step S402), and retrieves the job information M from the processed-job list 131 (Step S403). Next, the controller 111 determines whether or not the retrieved job information M includes the taking out completion information (Step S404). When the taking out completion information is included (Step S404: Y), the controller 111 compares the discharge destination information in the processed-job list 131 with the taking out completion information (Step S405). When the same tray name is included (Step S406: Y), the controller 111 uses the result of comparison in Step S405 to delete the same tray name from the discharge destination information of the display job list (Step S407). After that, the controller 111 determines whether or not retrieval is finished for all processed jobs in the processed-job list 131 (Step S408). The same processing is performed also when the taking out completion information is not included in Step S404 (Step S404: N) and when the same tray name is not included in Step S406 (Step S406: N). When retrieval of all processed jobs is not finished (Step S408: N), the controller 111 adds 1 to the variable M (Step S409), and the processing returns to Step S403. When retrieval of all processed jobs is finished (Step S408: Y), the series of processing is ended.

Figure 11:
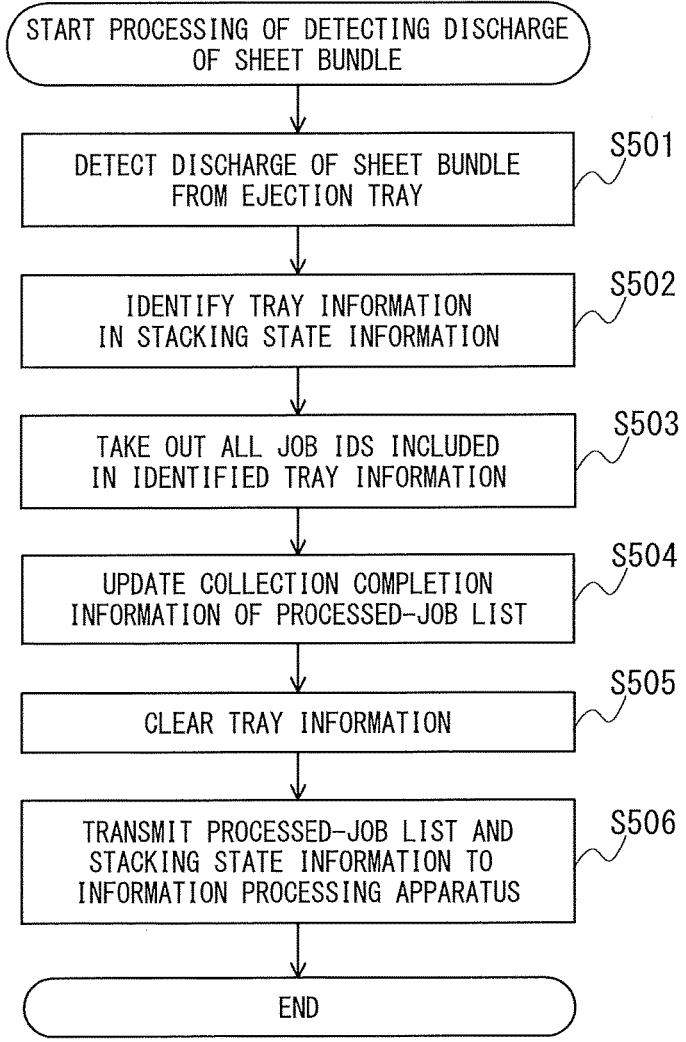
FIG. 11 is a control flow for illustrating a procedure of processing of detecting discharge of a sheet bundle.

Next, description is given of an operation at the time when a sheet bundle is detected to be discharged to the outside of the apparatus in the sheet discharge tray (ejection tray) identified from the discharge destination information. The discharge of the sheet bundle is detected by the image forming apparatus 101. FIG. 11 is a control flow to be performed by the controller 121 at this time. Referring to FIG. 11, when the controller 121 detects the discharge of the sheet bundle from the ejection tray (Step S501), the controller 121 identifies the tray information corresponding to the ejection tray from which the sheet bundle is discharged in the stacking state information 133 (Step S502). When the tray information is identified, the controller 121 takes out all job IDs included in the tray information from the tray information (Step S503). The controller 121 retrieves the job ID from the processed-job list 131, and updates the taking out completion information of the job information having the corresponding job ID (Step S504). When the taking out completion information of the job information is updated, the name of the tray for which taking out is completed is added. After that, the controller 121 clears the tray information from which the stacking state information 133 is removed (Step S505). In this case, clearing the tray information refers to setting the total stacked-sheet number count in the tray information to 0 and forming an empty sheet bundle information list. The controller 121 transmits the updated processed-job list 131 and stacking state information 133 to the information processing apparatus 100 (Step S506), and the series of processing is ended.

Figure 12:
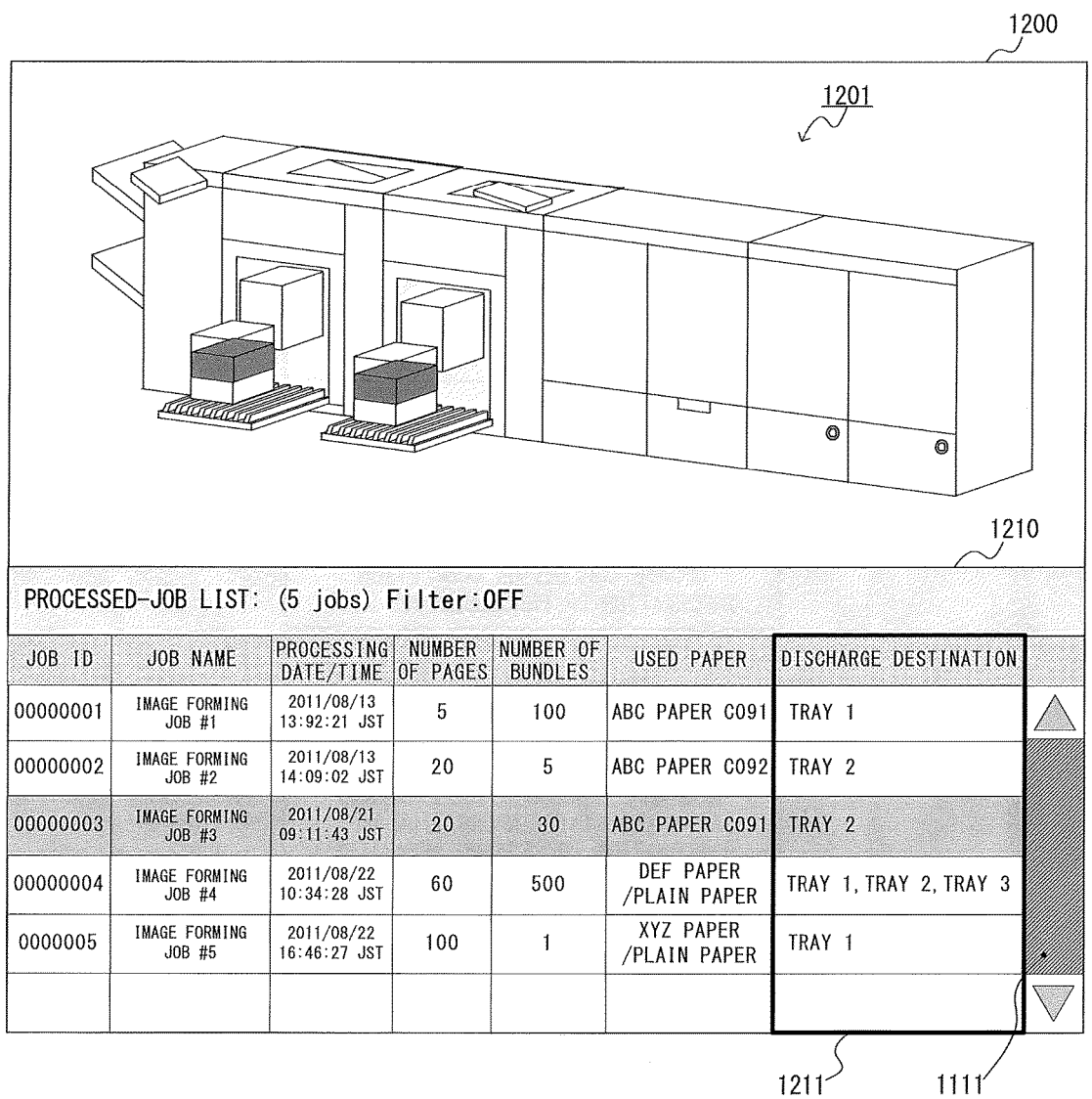
FIG. 12 is a diagram for illustrating a monitor screen.

The operator can check the stacking state of each sheet discharge apparatus connected to the image forming apparatus 101 as required by an application executed by the computer program for terminal control in the information processing apparatus 100. The stacking state is checked through a monitor screen displayed on the display 113 of the information processing apparatus 100. An example of a monitor screen is illustrated in FIG. 12. In a monitor screen 1200 exemplified in FIG. 12, an image region 1201 and a list region 1210 are formed. The image region 1201 is a region for visually displaying the system configuration image and the sheet or sheet-bundle stacking state of each image forming job, and has a two-layer structure. That is, the image region 1201 includes a first display layer for displaying the system configuration image, and a second display layer for mapping and displaying a sheet bundle image at the sheet stacking portion of the system configuration image on the first display layer. In the first display layer, the system configuration image generated based on the apparatus display information 132 is displayed. In the second display layer, based on the stacking state information 133 received by the information processing apparatus 100, the sheet bundle image generated in accordance with the sheet or sheet-bundle stacking state in each sheet discharge tray is mapped and displayed. The sheet bundle image is updated in real time at a timing at which the change in sheet stacking state is detected. That is, the controller 111 is configured so that the mode of displaying the sheet bundle image on the display 113 can be changed in real time for each image forming job.

In FIG. 12, the system configuration image 1201 in a state in which no sheets are stacked on the sheet discharge tray is displayed. In the list region 1210, the processed-job list received by the information processing apparatus 100 from the image forming apparatus 101 is displayed. In the processed-job list, job attributes (job ID, image forming job name, number of pages, number of bundles, used sheet, and discharge destination) of each processed job are displayed. For example, discharge destination is shown in column 1211. The controller 111 allows the sheet bundle image to be displayed in the order in the processed-job list. Further, the controller 111 allows the sheet bundle image corresponding to the designated processed job and the sheet bundle image corresponding to other processed jobs to be displayed in a distinguished manner.

The operator can designate any processed job on the processed-job list through the input portion 114. In the example of FIG. 12, there is illustrated a state in which a processed job (job name: image forming job #3) having a job ID of "00000003" is designated. When the number of processed jobs listed in the processed-job list is larger than the number of jobs that can be displayed at one time in the list region 1210, a scroll bar 1111 is used. The operator can operate the scroll bar 1111 to designate any processed job. The designated processed job is displayed in a highlighted (inverted) manner to be distinguished from other processed jobs.

Figure 13:
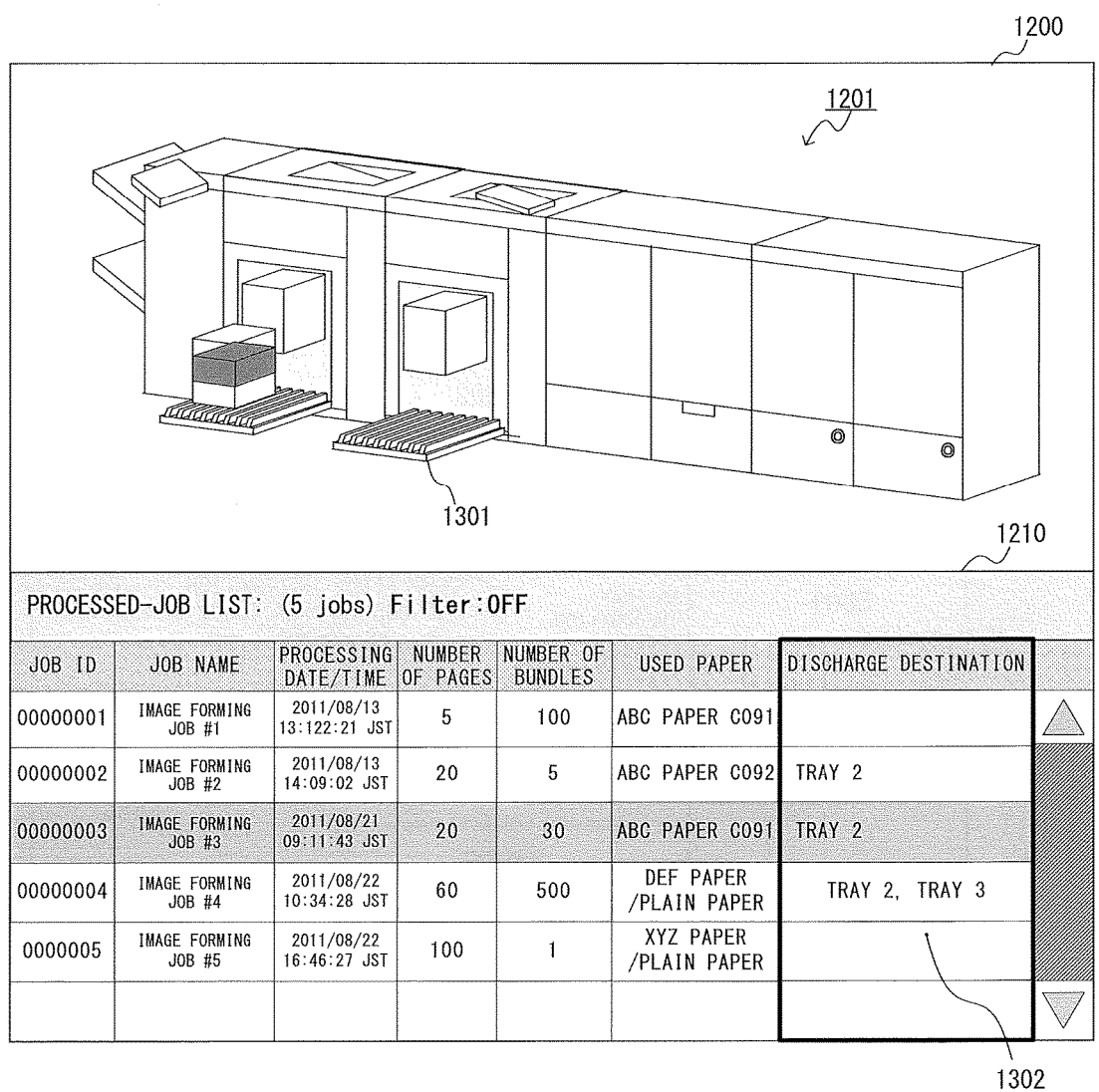
FIG. 13 is another diagram for illustrating the monitor screen.

FIG. 13 is a diagram for illustrating a monitor screen to be displayed on the display 113 when the sheet bundle is taken out. As in FIG. 12, the discharge destination is shown in column 1302. When the sheet bundle is discharged from a sheet discharge tray 1301, the control flow of FIG. 11 is executed, and the discharge destination information on the job corresponding to the discharged sheet bundle is changed (deleted) from the list region 1210.

Figure 14:
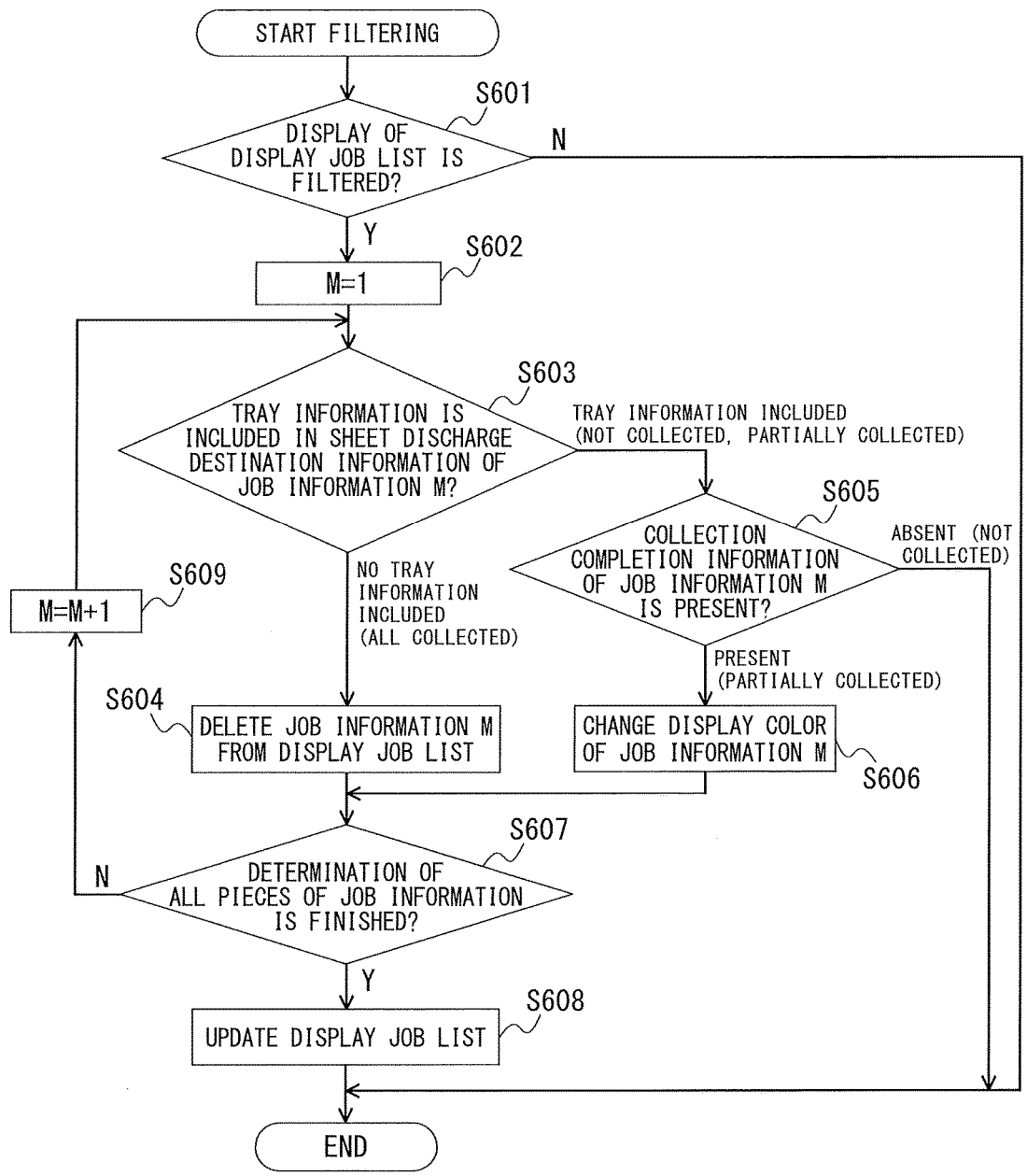
FIG. 14 is a control flow for illustrating a processing procedure of filtering.

The information processing apparatus 100 can filter the processed job for which the sheets having the images formed thereon are not taken out from the display job list. FIG. 14 is a control flow to be performed by the controller 111 at this time. The controller 111 waits for detection of an instruction to filter display of the display job list based on the user's operation (Step S601: N). When the filtering instruction is detected (Step S601: Y), the controller 111 substitutes 1 for the variable M representing the order of job information (Step S602), and determines the discharge destination information of the job information M from the display job list (Step S603). When the discharge destination information is empty (Step S603: NO TRAY INFORMATION INCLUDED), the controller 111 deletes the job information M from the display job list (Step S604). When the discharge destination information includes the tray information (Step S603: TRAY INFORMATION INCLUDED), the controller 111 determines whether or not the taking out completion information of the display job list is present (Step S605). When the taking out completion information is empty (Step S605: ABSENT), the processing is ended. When the taking out completion information is present (Step S605: PRESENT), the controller 111 changes the display color of the job information M (Step S606). After that, the controller 111 determines whether or not determination of all pieces of job information is finished (Step S607). When determination of all of pieces of job information is finished (Step S607: Y), the controller 111 updates the display job list (Step S608), and the series of processing is ended. When determination of the job information is not finished (Step S607: N), the controller 111 adds 1 to the variable M (Step S609), and the processing returns to Step S603.

Figure 15:
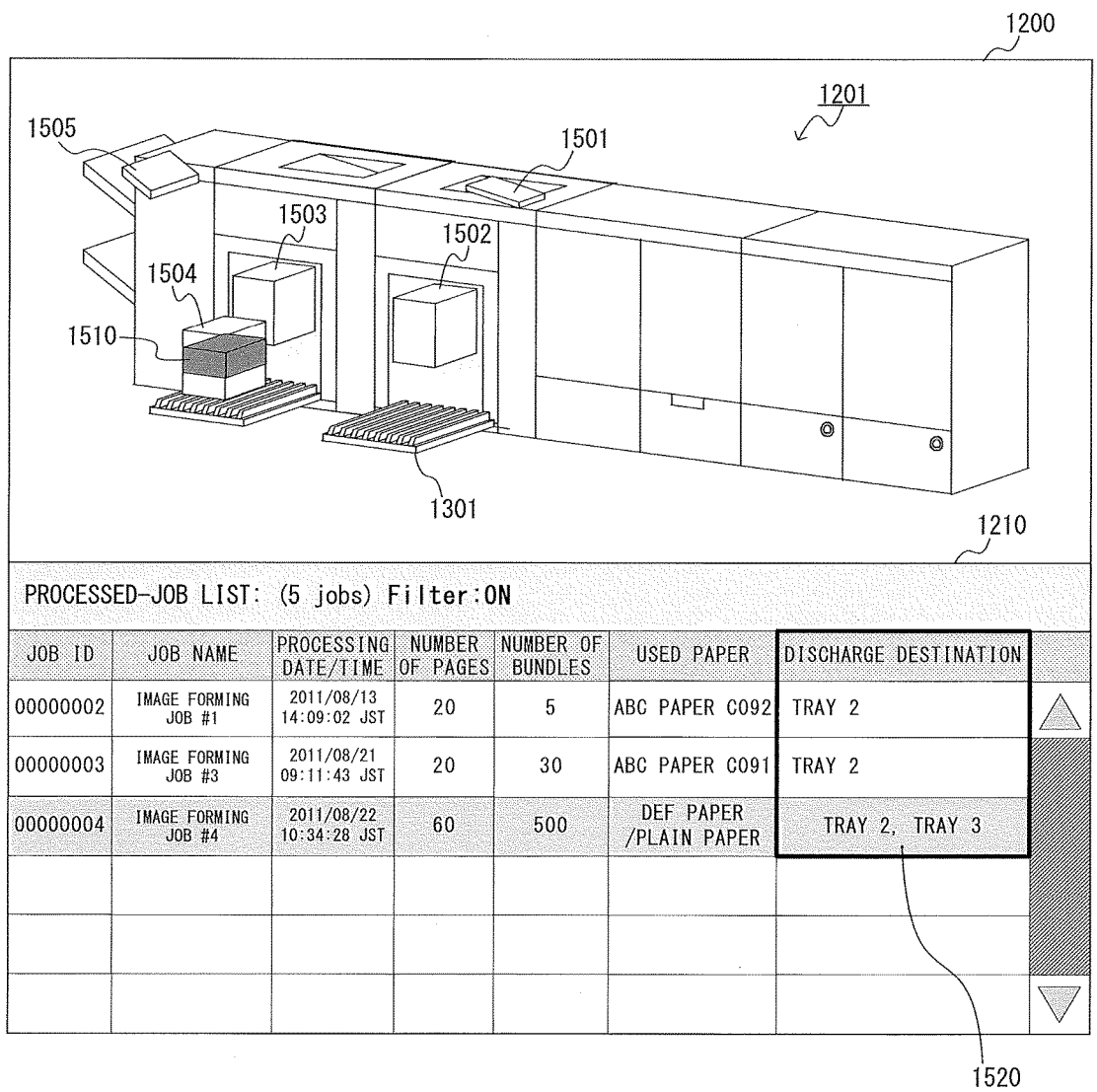
FIG. 15 is another diagram for illustrating the monitor screen.

FIG. 15 is a schematic diagram for illustrating a state in which, in the monitor screen, the processed job for which sheets are not taken out is filtered. As in FIG. 12, the discharge destination is shown in column 1520. In accordance with the control flow of FIG. 14, in FIG. 13, the job information having no discharge destination information is masked. Further, for example, as the job having the job ID of "00000003", the image forming job for which the sheets are partially taken out can be displayed with the display color being changed.

As described above, according to the first embodiment, the position of the sheet bundle corresponding to the designated processed job can be easily identified through the display of the system configuration image and the sheet bundle image. Further, the processed job for which sheets having images formed thereon are not taken out is filtered to be displayed, and thus only the processed job for which the sheet bundle is currently stacked on the sheet discharge tray is displayed on the list. This list display is updated in real time in accordance with the state of the sheet discharge tray. The processed job for which only a part of the sheets having the images formed thereon is taken out is displayed in a different display mode. Therefore, the current stacking and taking out state of the sheet discharge tray can be known, and hence the processed job for which sheets having images formed thereon are not taken out can be easily recognized. In this manner, the sheet bundle can be reliably taken out. Further, it can be easily determined which discharge destination is required to be designated as the discharge destination for the image forming jobs for which images are formed thereafter to achieve efficiency, and the convenience is enhanced.

Other Embodiments

In the first embodiment, a configuration example in which the information processing apparatus 100 and the image forming apparatus 101 are separate members is described, but the image forming apparatus 101 may have the function of the information processing apparatus 100. That is, the image forming apparatus 101 may include the storage 112, the display 113, and the input portion 114. In this case, the functions of generating the system configuration image and the sheet bundle image are achieved by the controller 121. That is, the controller 121 operates as a control device for generating the system configuration image and the sheet bundle image and displaying the generated system configuration image and the generated sheet bundle image on the display 113.

In the first embodiment, description is given of an example in which the processed job for which the sheets are partially taken out is displayed in a display mode that is different from those of other processed jobs, but this case is merely an example. For example, the processed job for which the sheets are partially taken out may be displayed in the same display mode as the processed job for which sheets are not taken out.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation to encompass all such modifications and equivalent structures and functions.

This application claims the benefit of Japanese Patent Application No. 2017-101135, filed May 22, 2017, which is hereby incorporated by reference herein in its entirety.

What is claimed is:

1. A control device for controlling an image forming system having an image forming apparatus configured to form images on sheets based on a plurality of image forming jobs and a plurality of stacking trays on which the sheets are to be stacked, the control device comprising:
   a storage to store sheet stacking information indicating a stacking amount of sheets stacked on the plurality of stacking trays;
   a generator configured to generate sheet bundle images for displaying the sheets stacked on the plurality of stacking trays based on the sheet stacking information stored in the storage; and
   a controller configured to display, on a display, the sheet bundle images together with a system configuration image indicating a configuration of the system, wherein the controller is configured to:
   filter, from the plurality of image forming jobs, image forming jobs for which sheets are not taken out from the plurality of stacking trays,
   display a list of the filtered image forming on the display,
   receive identification information for identifying an image forming job selected from the list by an operator, and
   display one of the sheet bundle images corresponding to the selected image forming job, in a distinguished manner from other of the sheet bundle images corresponding to the filtered image forming jobs.

2. The control device according to claim 1,
   wherein each of the plurality of stacking trays includes a sensor configured to detect presence or absence of a sheet, and
   wherein the controller is configured to determine, based on a detection signal of the sensor, that sheets stacked on a stacking tray including the sensor are taken out from the stacking tray.

3. The control device according to claim 2, wherein the controller is configured to control to display an image forming job for which only a part of the sheets having the images formed thereon is taken out in a display mode that is different from a display mode of the filtered image forming job for which all of sheets are not taken out.

4. The control device according to claim 1,
   wherein the display has a list region for displaying the list, and
   wherein the list region, the sheet bundle images, and the system configuration image are displayed together on the display.

5. The control device according to claim 4, wherein, in each of the plurality of image forming jobs displayed on the list, discharge destination information on the sheets having the images formed thereon is displayed.

6. The control device according to claim 4, wherein the controller allows the sheet bundle images to be displayed in an order that is based on the display on the list.

7. The control device according to claim 4, wherein the controller is configured to update the sheet stacking information in a case where the sheet bundle stacked on any one of the plurality of stacking trays is taken out.

8. The control device according to claim 1, wherein the controller is configured to control to map and display only the sheet bundle image corresponding to the selected image forming job on the system configuration image.

9. An image forming system comprising:
an image forming apparatus configured to form images on sheets based on a plurality of image forming jobs and a plurality of stacking trays on which the sheets are to be stacked;
a storage to store sheet stacking information indicating a stacking amount of sheets stacked on each of the plurality of stacking trays;
a controller configured to generate sheet bundle images for displaying the sheets stacked on the plurality of stacking trays based on the sheet stacking information stored in the storage, and to display, on a display, the sheet bundle images together with a system configuration image indicating a configuration of the system,
wherein the controller is configured to:
filter, from the plurality of image forming jobs, image forming jobs for which sheets are not taken out from the plurality of stacking trays,
display a list of the filtered image forming jobs on the display,
receive identification information for identifying an image forming job selected from the list by an operator, and
display one of the sheet bundle images corresponding to the selected image forming job, in a distinguished manner from other of the sheet bundle images corresponding to the filtered image forming jobs.

10. A non-transitory computer readable storage medium storing a computer program to cause a control device to perform a method for controlling an image forming system having an image forming apparatus configured to form images on sheets based on a plurality of image forming jobs and a plurality of stacking trays on which the sheets are to be stacked, the method comprising:
storing, in a storage, sheet stacking information indicating a stacking amount of sheets stacked on each of the plurality of stacking trays;
generating sheet bundle images for displaying the sheets stacked on the plurality of stacking trays based on the sheet stacking information stored in the storage; and
displaying, on a display, the sheet bundle images together with a system configuration image indicating a configuration of the system, wherein displaying includes:
filtering, from the plurality of image forming jobs, image forming jobs for which sheets are not taken out from the plurality of stacking trays,
displaying a list of the filtered image forming jobs on the display,
receiving identification information for identifying an image forming job selected from the list by an operator, and
displaying one of the sheet bundle images corresponding to the selected image forming job, in a distinguished manner from other of the sheet bundle images corresponding to the filtered image forming jobs.

11. A method for a control device for controlling an image forming system having an image forming apparatus configured to form images on sheets based on a plurality of image forming jobs and a plurality of stacking trays on which the sheets are to be stacked, the method comprising:
storing, in a storage, sheet stacking information indicating a stacking amount of sheets stacked on the plurality of stacking trays;
generating sheet bundle images for displaying the sheets stacked on the plurality of stacking trays based on the sheet stacking information stored in the storage; and
displaying, on a display, the sheet bundle images together with a system configuration image indicating a configuration of the system, wherein displaying includes:
filtering, from the plurality of image forming jobs, image forming jobs for which sheets are not taken out from the plurality of stacking trays,
displaying a list of the filtered image forming jobs on the display,
receiving identification information for identifying an image forming job selected from the list by an operator, and
displaying one of the sheet bundle images corresponding to the selected image forming job, in a distinguished manner from other of the sheet bundle images corresponding to the filtered image forming jobs.

12. The method according to claim 11,
wherein each of the plurality of stacking trays includes a sensor configured to detect presence or absence of a sheet, and
wherein displaying includes determining, based on a detection signal of the sensor, that sheets stacked on a stacking tray including the sensor are taken out from the stacking tray.

13. The method according to claim 12, wherein displaying includes displaying an image forming job for which only a part of the sheets having the images formed thereon is taken out in a display mode that is different from a display mode of the filtered image forming job for which all of sheets are not taken out.

14. The method according to claim 11,
wherein the display has a list region for displaying the list, and
wherein the list region, the sheet bundle images, and the system configuration image are displayed together on the display.

15. The method according to claim 14, wherein, in each of the plurality of image forming jobs displayed on the list, discharge destination information on the sheets having the images formed thereon is displayed.

16. The method according to claim 14, wherein displaying includes allowing the sheet bundle images to be displayed in an order that is based on the display on the list.

17. The method according to claim 14, wherein displaying includes updating the sheet stacking information in a case where the sheet bundle stacked on any one of the plurality of stacking trays is taken out.

18. The method according to claim 11, wherein displaying includes controlling to map and display only the sheet bundle image corresponding to the selected image forming job on the system configuration image.

* * * * *